United States Patent
Afzali-Ardakani et al.

(10) Patent No.: US 10,546,303 B2
(45) Date of Patent: Jan. 28, 2020

(54) OPTICALLY VISIBLE CARBON NANOTUBE WITH NANOCRYSTALS DECORATION AS UNIQUE ID

(71) Applicant: International Business Machines Corporation, Armonk, NY (US)

(72) Inventors: Ali Afzali-Ardakani, Ossining, NY (US); Shu-Jen Han, Cortlandt Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 22 days.

(21) Appl. No.: 15/465,297

(22) Filed: Mar. 21, 2017

(65) Prior Publication Data
US 2018/0276682 A1    Sep. 27, 2018

(51) Int. Cl.
*G06Q 30/00* (2012.01)

(52) U.S. Cl.
CPC ................. *G06Q 30/0185* (2013.01)

(58) Field of Classification Search
CPC .............. G06Q 30/0185; G06K 7/1417
USPC .............................................. 427/7
See application file for complete search history.

(56) References Cited

U.S. PATENT DOCUMENTS

| | | | |
|---|---|---|---|
| 7,588,699 B2 | 9/2009 | Park et al. | |
| 7,682,523 B2 | 3/2010 | Weisman et al. | |
| 7,754,107 B2 | 7/2010 | Wu et al. | |
| 8,366,999 B2 | 2/2013 | Ward et al. | |
| 8,735,852 B2 | 5/2014 | Boday et al. | |
| 8,766,258 B1 | 7/2014 | Dimitrakopoulos et al. | |
| 9,006,667 B2 | 4/2015 | Boday et al. | |
| 9,424,505 B2 | 8/2016 | Thalappil et al. | |
| 2014/0363643 A1 | 12/2014 | Afzali-Ardakani et al. | |
| 2016/0191255 A1 | 6/2016 | Haensch et al. | |
| 2016/0373255 A1 | 12/2016 | Han | |

OTHER PUBLICATIONS

Mao et al. Coating carbon nanotubes with colloidal nanocrystals by combining an electrospray technique with directed assembly using an electrostatic field, Nanotechnology,19, 2008, 455610 (7 pages). (Year: 2008).*

Kim et al. Anti-counterfeit nanoscale fingerprints based on randomly distributed nanowires, Nanotechnology, 25, 2014, 155303 (7 pages). (Year: 2014).*

Hu et al. Physically unclonable cryptographic primitives using self-assembled carbon nanotubes, Nature Nanotechnology, 11, 2016, pp. 559-565. (Year: 2016).*

(Continued)

*Primary Examiner* — Kelly M Gambetta
(74) *Attorney, Agent, or Firm* — Vazken Alexanian; Michael J. Chang, LLC (57) ABSTRACT

A unique ID using optically visible carbon nanotubes with nanocrystal decoration is provided. In one aspect, a method for creating a unique ID includes: providing a substrate having an array of trenches; randomly placing carbon nanotubes throughout the array such that each trench either contains a carbon nanotube or does not, wherein the random placement of the carbon nanotubes throughout the array of trenches includes code information that forms the unique ID; and coating the carbon nanotubes with optically visible nanocrystals. A unique ID and authentication method using the unique ID are also provided.

19 Claims, 9 Drawing Sheets

(56) References Cited

OTHER PUBLICATIONS

Hu et al., "Physically unclonable cryptographic primitives using self-assembled carbon nanotubes," Nature Nanotechnology 11 (Feb. 2016) (8 pages).
Park et al. "High-density integration of carbon nanotubes via chemical self-assembly," Nature Nanotechnology, 7, 787-791 (Oct. 2012).
Zeevi et al., "Automated circuit fabrication and direct characterization of carbon nanotube vibrations," nature communications 7, 12153 (Jul. 2016) (10 pages).
Jain et al., "Statistical Pattern Recognition: A Review," IEEE Transactions on Pattern Analysis and Machine Intelligence, vol. 22, No. 1, pp. 4-37 (Jan. 2000).
D.R. Kauffman et al., "Understanding the sensor response of metal-decorated carbon nanotubes," Nano Letters, vol. 10, No. 3, Feb. 2010, pp. 958-963 (6 pages).

\* cited by examiner

OPTICALLY VISIBLE CARBON NANOTUBE WITH NANOCRYSTALS DECORATION AS UNIQUE ID

FIELD OF THE INVENTION

The present invention relates to unique identification (ID) techniques, and more particularly, to a unique ID using optically visible carbon nanotubes with nanocrystal decoration that can be easily read, for example, using an optical microscope.

BACKGROUND OF THE INVENTION

Counterfeit or fake products infiltrate virtually all industries. Counterfeit products deprive manufacturers of revenue, harm brand integrity and in some cases compromise safety. Accordingly, manufacturers and brand owners strive to keep counterfeit goods out of their supply chains.

Besides counterfeit goods, grey-market products are genuine goods that are leaked into the marketplace where the original, legitimate manufacturer does not receive the full market revenue value. Thus, manufacturers strive to prevent grey-market goods from being distributed and sold.

A useful tool in preventing counterfeit and grey market products would be a unique identification for products that is low-cost, anti-cloning, tamper-proof, and from which data can be easily and effectively retrieved.

SUMMARY OF THE INVENTION

The present invention provides a unique identification (ID) using optically visible carbon nanotubes with nanocrystal decoration. In one aspect of the invention, a method for creating a unique ID is provided. The method includes the steps of: providing a substrate having an array of trenches; randomly placing carbon nanotubes throughout the array of trenches such that each trench either contains a carbon nanotube or does not, wherein the random placement of the carbon nanotubes throughout the array of trenches includes code information that forms the unique ID; and coating the carbon nanotubes with optically visible nanocrystals.

In another aspect of the invention, a unique ID is provided. The unique ID includes: a substrate having an array of trenches; carbon nanotubes randomly placed throughout the array of trenches such that each trench either contains a carbon nanotube or does not, wherein the random placement of the carbon nanotubes throughout the array of trenches includes code information that forms the unique ID; and optically visible nanocrystals coating the carbon nanotubes.

In yet another aspect of the invention, an authentication method is provided. The authentication method includes the steps of: providing a unique ID including: a substrate having an array of trenches, carbon nanotubes randomly placed throughout the array of trenches such that each trench either contains a carbon nanotube or does not, and optically visible nanocrystals coating the carbon nanotubes, wherein the random placement of the carbon nanotubes throughout the array of trenches includes code information that forms the unique ID, and wherein the optically visible nanocrystals are selected from the group consisting of: p-nitrobenzoic acid, halogenated 4-nitrobenzoic acids, 2-fluoro-4-nitrobenozic acid, 3,5-difluoro-4-nitrobenozic acid, 2-iodo-4-nitrobenzoic acid, 2,3,5,6-tetrafluoro-4-nitrobenzoic acid, 3,5-dimethyl-4-nitrobenzoic acid, 3-trifluoromethyl-4-nitrobenzoic acid, and combinations thereof; capturing an image of the unique ID; analyzing the image to extract the code information from the unique ID; and using the code information extracted from the unique ID for authentication.

A more complete understanding of the present invention, as well as further features and advantages of the present invention, will be obtained by reference to the following detailed description and drawings.

DETAILED DESCRIPTION OF PREFERRED EMBODIMENTS

As provided above, with the prevalence of counterfeit and grey market products, it would be desirable to be able to provide a low-cost but effective unique identification for products from which data can be easily retrieved. Physically unclonable functions or PUFs have been demonstrated using the random placement of carbon nanotubes. See, for example, Hu et al., "Physically unclonable cryptographic primitives using self-assembled carbon nanotubes," Nature Nanotechnology, 11 (February 2016) (8 pages), the contents of which are incorporated by reference as if fully set forth herein. Such devices, however, require a more expensive fabrication process (to form multi-level interconnects) and require electrical contact in order to retrieve the embedded identification (ID) code, which is challenging from a package point of view.

Advantageously, provided herein are techniques for creating a unique ID based on an array of randomly placed carbon nanotubes which are decorated with optically visible nanocrystals. By doing so, code information can be read from the ID by simply using an optical microscope to capture an image of the array. Image processing can then be used to retrieve the information. This is a low-cost, efficient and effective solution that may be employed to provide unique identification for a range of products. Notably, since electrical contact is not needed to retrieve the code from the ID, the ID can be used in a versatile number of applications, such as on product labels that can be easily read using a visual scanner with image capturing and analyzing capabilities.

Figure 1:
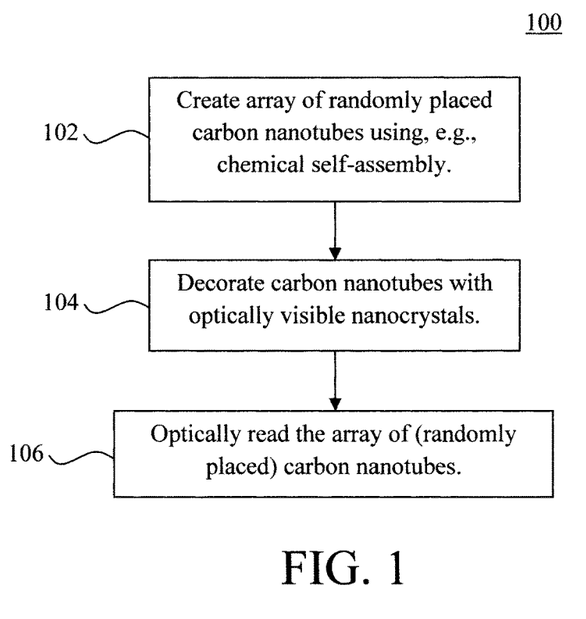
FIG. 1 is a diagram illustrating an exemplary methodology for creating a unique identification (ID) array using random carbon nanotube placement according to an embodiment of the present invention.
Figure 2:
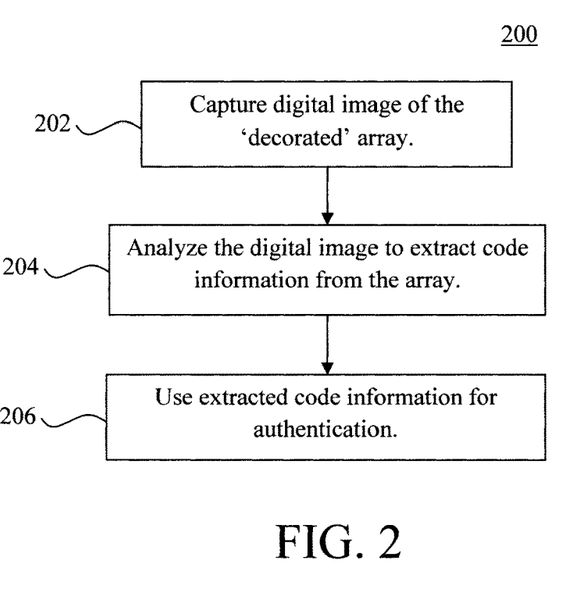
FIG. 2 is a diagram illustrating an exemplary methodology for visually extracting coding information from the present unique ID arrays according to an embodiment of the present invention.
Figure 3:
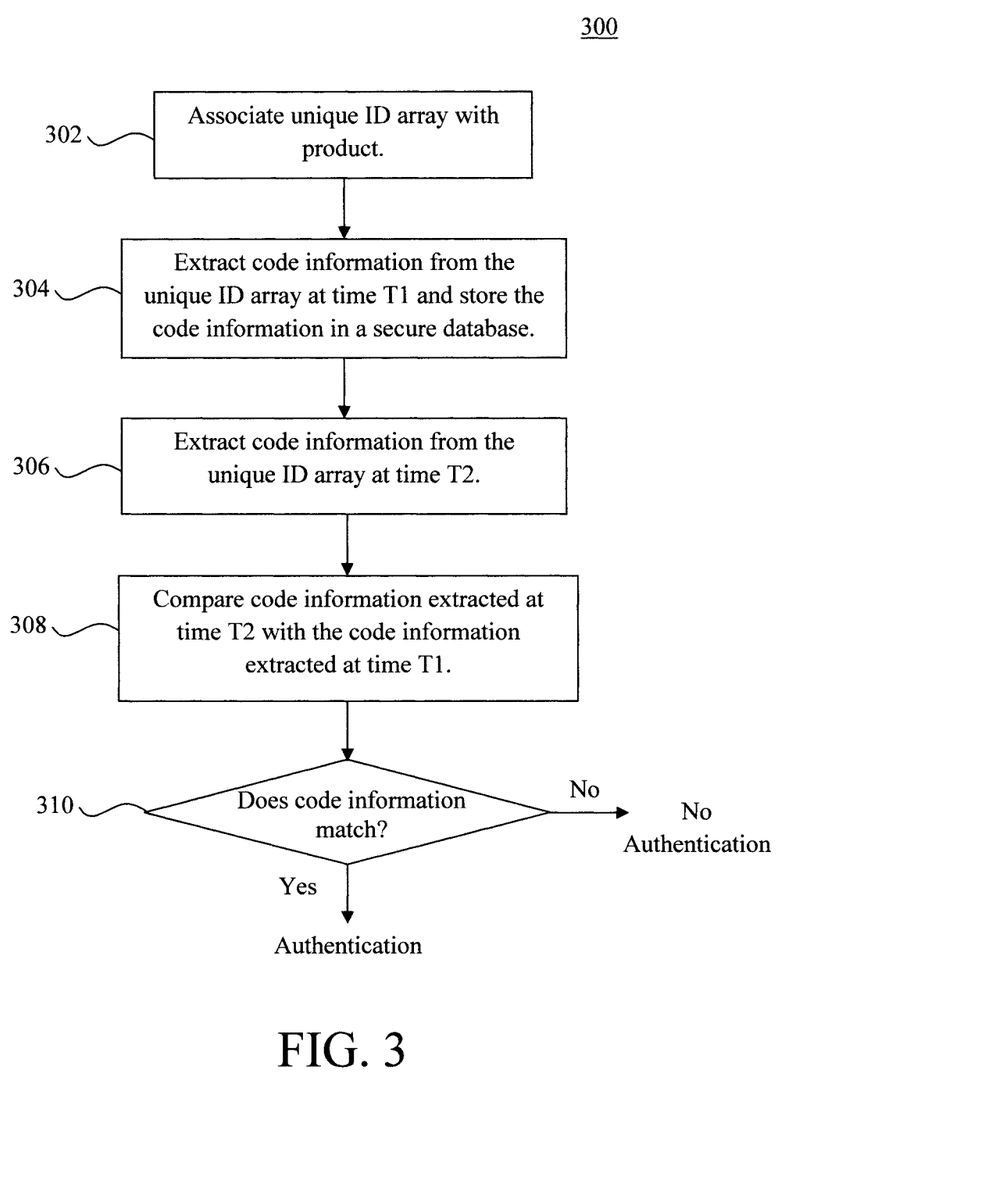
FIG. 3 is a diagram illustrating exemplary methodology for authentication using the present unique ID arrays according to an embodiment of the present invention.

An overview of the present techniques is now provided by way of reference to FIGS. 1-3. FIG. 1 illustrates an exemplary methodology 100 for creating a unique ID.

In step 102, an array of randomly placed carbon nanotubes is created. As is known in the art, carbon nanotubes are cylindrical nanostructures of carbon. Carbon nanotubes, as-synthesized, contain both metallic and semiconducting carbon nanotubes. Specifically, due to different chiralities about ⅓ of carbon nanotubes synthesized exhibit metallic behaviors, while about ⅔ show semiconducting behaviors. Apart from their very different conductance, metallic and semiconducting carbon nanotubes are basically indistinguishable from one another. According to the present techniques, since conductivity of the carbon nanotubes is not a factor during placement or readout, both metallic and semiconducting carbon nanotubes can be used in the present process. Thus, when reference is made below to carbon nanotubes it is understood that these can be either metallic or semiconducting carbon nanotubes, and the array will likely contain some of both types. Further, as will be described in detail below, information will be encoded in the array based on which sites have or do not have a carbon nanotube present irrespective of whether it is a metallic or semiconducting carbon nanotube.

According to an exemplary embodiment, the random placement of the carbon nanotubes in the array is achieved using chemical self-assembly techniques to deposit the carbon nanotubes into an array of trenches patterned in a substrate wherein, based on the dimensions of trenches, there is a probability that each trench will or will not contain a carbon nanotube. Based on how the dimensions of the trenches are configured, this probability can be around 50%, i.e., it is equally likely that any given trench will include a carbon nanotube as not. Namely, as will be described in further detail below, chemical self-assembly involves interaction (attractive or repulsive) between charged surfaces on the substrate, trenches, and carbon nanotubes. For example, a negative surface charge on the substrate and carbon nanotubes, and a positive surface charge in the trenches will naturally direct the carbon nanotubes to the trenches. Thus, if the trenches are made wide enough, it is statistically possible to have each trench contain at least one carbon nanotube. On the other hand, if the trenches are made narrow enough then the negative charge on the substrate bordering the trenches will repel the negative charge on the carbon nanotubes and statistically none of the trenches would contain a carbon nanotube (even if the trenches are physically large enough to accommodate a carbon nanotube). Ideally however, to have a random key, it is desirable for some of the trenches in the array to (randomly) contain a carbon nanotube, while other trenches (randomly) do not. Thus, it is preferable to engineer the trench dimensions such that it is statistically (e.g., equally) possible for any given trench to either contain at least one carbon nanotube or not.

An exemplary chemical self-assembly process is described, for example, in Park et al. "High-density integration of carbon nanotubes via chemical self-assembly," Nature Nanotechnology, 7, 787-791 (October 2012) (hereinafter "Park"), the contents of which are incorporated by reference as if fully set forth herein. As described in Park, selective placement can be achieved based on ion exchange between a functional surface monolayer and surfactant-wrapped carbon nanotubes which are processed in an aqueous solution. Specifically, a surface monolayer is formed from 4-(N-hydroxycarboxamido)-1-methylpyridinium iodide (NMPI) which contains hydroxamic acid end groups that self-assemble on some surfaces (such as hafnium oxide ($HfO_2$)) but not others (such as silicon oxide ($SiO_2$)). The functionalized surface can then be contacted with an aqueous solution of surfactant-wrapped carbon nanotubes whereby the anion of the NMPI is exchanged with the anionic surfactant wrapped around the carbon nanotubes leading to a strong coulombic attraction between the negatively charged surfactant and the positively charged monolayer. As a result, self-assembly of the carbon nanotubes can be achieved on the $HfO_2$ surfaces selective to the $SiO_2$ surfaces.

Thus, in the context of the above example, the substrate can include a layer of $SiO_2$ on a layer of $HfO_2$, i.e., a $SiO_2$/$HfO_2$ bilayer. Patterning an array of trenches in the $SiO_2$ layer will expose the underlying $HfO_2$ within the trenches. Self-assembly of a monolayer of NMPI selectively on the exposed $HfO_2$ is then performed. As provided above, due to its hydroxamic acid end groups NMPI will self-assemble on the $HfO_2$ surfaces but not on the $SiO_2$. Accordingly, the NMPI monolayer will form only within the trench.

The carbon nanotubes can be wrapped in a surface-active dispersing agent, such as sodium dodecylsulfate (SDS) to create a negative surface charge thereon. This can be done in an aqueous solution. Namely, wrapping the carbon nanotubes in the surfactant allows the carbon nanotubes to be dispersed in water forming the aqueous solution.

If the aqueous solution of the surfactant-wrapped metallic carbon nanotubes is then contacted with the substrate, the negative iodide ion of the NMPI monolayer within the trenches is exchanged with the positive sodium ion of the SDS to form sodium iodide, resulting in a strong Coulombic attraction between the positively charged (NMPI) monolayer and the negatively charged surfactant. Thus, the carbon nanotubes will adhere only to the NMPI surface (i.e., not to the negatively charged $SiO_2$ surface of the substrate). However, as provided above, the repulsive forces of the $SiO_2$ bordering the trenches will prevent the carbon nanotubes from landing in some of the trenches. Which trenches will or will not contain a carbon nanotube is random (and this probability can be adjusted based on the trench dimensions—see above), and trenches containing a carbon nanotube can contain multiple carbon nanotubes. Thus, a random placement is achieved by this chemical self-assembly-based process.

Figure 4A:
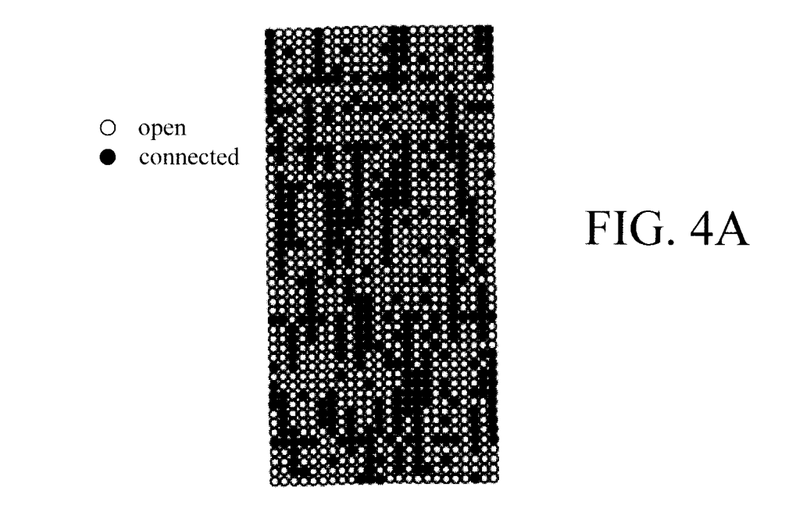
FIG. 4A is a diagram illustrating an exemplary carbon nanotube array produced using the present techniques according to an embodiment of the present invention.
Figure 4B:
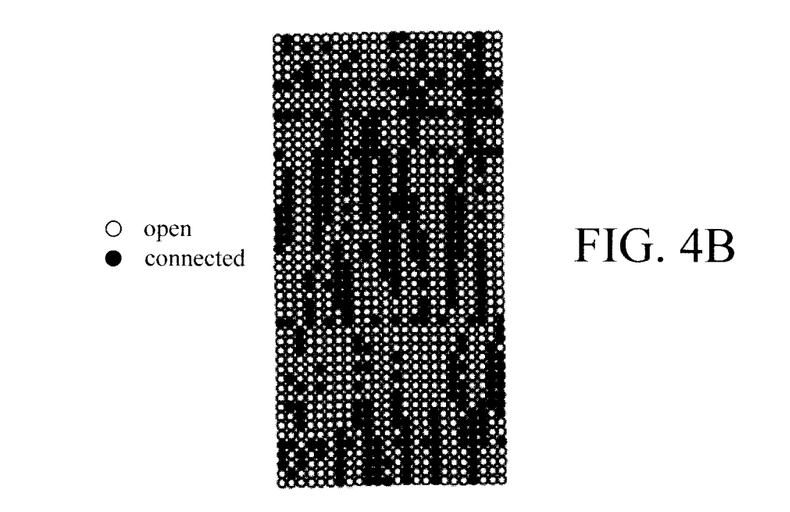
FIG. 4B is a diagram illustrating another exemplary carbon nanotube array produced using the present techniques that, due to random placement of the carbon nanotubes is different from the array shown in FIG. 4A according to an embodiment of the present invention.

This random placement of the carbon nanotubes in the array is the unique ID. Namely, since the placement of the carbon nanotubes in the trenches throughout the array is random, then the same fabrication process can produce distinct/unique arrays that are different from one another. The arrays will differ based on which trenches contain at least one carbon nanotube (connected) and which do not (open). See FIGS. 4A and 4B. FIGS. 4A and 4B depict exemplary arrays produced using the above-described techniques. The arrays are different from one another, and thus unique. For example, as shown in FIGS. 4A and 4B, due to the random placement of the carbon nanotubes, the combination of sites/trenches that are either open or connected in one array is different from the combination of sites/trenches that are either open or connected in the other. This random placement of open and connected sites represents the coding information contained in the array which, advantageously, can be extracted using visualization rather than electrical means.

It is notable that this process of creating surface charges via $SiO_2$, $HfO_2$/NMPI, and SDS is merely an example. Other exemplary techniques for chemical self-assembly are described below.

In step 104, the carbon nanotubes are decorated with optically visible nanocrystals. Suitable optically visible nanocrystals for decorating the carbon nanotubes include, but are not limited to, p-nitrobenzoic acid (p-NBA), halogenated 4-nitrobenzoic acids, 2-fluoro-4-nitrobenozic acid, 3,5-difluoro-4-nitrobenozic acid, 2-iodo-4-nitrobenzoic acid, 2,3,5,6-tetrafluoro-4-nitrobenzoic acid, 3,5-dimethyl-4-nitrobenzoic acid, and/or 3-trifluoromethyl-4-nitrobenzoic acid. Sublimation can be used to coat the carbon nanotubes with these materials. For instance, a source of the nanocrystals such as a powder containing at least one of the above-listed compounds is heated within an enclosure, creating a vapor. By way of example only, the heating can be conducted at a temperature of from about 100° C. to about 200° C., and ranges therebetween, for a duration of from about 10 minutes to about 1 hour, and ranges therebetween. Samples of the carbon nanotube arrays are then placed within the chamber in contact with the vapor, while the heat is removed from the source. The vapor will condense as nanocrystals on the surfaces of the carbon nanotubes. See, for example, Zeevi et al., "Automated circuit fabrication and direct characterization of carbon nanotube vibrations," nature communications 7, 12153 (July 2016) (10 pages), the contents of which are incorporated by reference as if fully set forth herein, which demonstrates that p-NBA nucleates along the carbon nanotube sidewalls.

Carbon nanotube themselves are small (about 1 nanometer (nm) in diameter) which is beyond the resolution of a typical optical microscope. To see carbon nanotubes, a costly scanning electron microscope or transmission electron microscope is needed. However, the optical nanocrystals are much large, usually hundreds of nanometers in size. Thus, once decorated, the carbon nanotube arrays can be read optically, e.g., using an optical microscope, in step 106. A detailed example of the process for extracting the code information from the arrays is described in conjunction with the description of FIG. 2, below. What is notable is that the information can be read from the arrays visually by way of the optically visible nanocrystals coated on the surfaces of the carbon nanotubes. Thus, wherever there is a carbon nanotube in the array, it can be detected by imaging.

FIG. 2 is a diagram illustrating an exemplary methodology 200 for visually extracting coding information from the present unique ID arrays. As provided above, the information is coded in the arrays based on which sites/trenches randomly contain a carbon nanotube, and which do not. The presence of a carbon nanotube is detected based on the optically visible nanocrystals coated on the surfaces of the carbon nanotubes. See above.

In step 202, an image of the array is captured. By way of example only, a digital image of the array is taken with the aid of an optical microscope to enlarge the details. By way of example only, any microscope can have a digital camera added on to capture images. For example, camera heads for a microscope are commercially available from Nikon Instruments Inc., Melville, N.Y.

In step 204, the digital image of the array is analyzed. A digital image is composed of pixels which can be analyzed by computer (see below) to decrypt the ID. Namely, analysis of the images can be used to determine which sites/trenches contain carbon nanotubes (via the optically visible nanocrystals coating) and which do not. As provided above, this random placement is the code information extracted from the unique ID. Established pattern recognition techniques may be employed to analyze the images. See, for example, Jain et al., "Statistical Pattern Recognition: A Review," IEEE Transactions on Pattern Analysis and Machine Intelligence, vol. 22, no. 1, pgs. 4-37 (January 2000), the contents of which are incorporated by reference as if fully set forth herein. In the present instance, the task is quite simple since the patterns have pre-defined shapes and locations, namely the carbon nanotubes in the array.

In step 206, the code information extracted from the array is used for authentication. By way of example only, the array may be associated with a particular product, such as on a label affixed to the product. By extracting the code information from the array, the authenticity of the product can be determined. For instance, only if the code information extracted from the array matches known code information for the product, can the product be authenticated. An exemplary process for authentication using the present unique ID arrays is described in conjunction with the description of FIG. 3.

In step 302, the unique ID array (created as per methodology 100, described above) is affixed or otherwise associated with a product. By way of example only, the unique ID array can be affixed to a label on the product, on a product packaging, provided as an insert in the packaged product, etc.

In step 304, for instance at a time T1, code information is extracted from the array optically (as per methodology 200, described above) and that code information is stored, e.g., in a secure database. For instance, steps 302 and 304 may be conducted while the product is in control of the source of the product, such as the manufacturer, distributor, retail seller of the product. This will provide a point of reference to compare and authenticate the product when the unique ID is later read. It is notable that the steps do not have to be performed in the same order described. For instance, the unique ID array can be prepared, read and logged in the secure database prior to allocating it to a particular product. Further, information about the product with which the unique ID is associated, time/date/location data, etc. can also be logged into the secure database.

In step 306, for instance at a time T2 after the product has been distributed (e.g., after the point of sale), the code information is again extracted from the array optically (as per methodology 200, described above). In step 308, the code information extracted at the time T2 is compared with the code information extracted at time T1 and stored in secure database. A determination is made in step 310 as to whether the code information extracted at the time T2 matches the code information stored in the secure database. If (Yes), the code information extracted at the time T2 does match the code information stored in the secure database, then the product is authenticated. On the other hand, if (No) the code information extracted at the time T2 does not match the code information stored in the secure database, then the product is not authenticated.

An exemplary implementation of the present techniques is now described by way of reference to FIGS. 5-11. As provided above, a chemical self-assembly-based process is preferably used to assist in randomly placing carbon nanotubes in an array of trenches 502 that have been patterned in a substrate 504. See FIG. 5. According to an exemplary embodiment, the chemical self-assembly process involves creating at least two different surfaces on the substrate to which the carbon nanotubes are exposed, one which attracts the carbon nanotubes (i.e., surface 504a), and one which does not attract the carbon nanotubes (i.e., surface 504b). The surface 504a which attracts the carbon nanotubes is present within the trenches 502, and the surface 504b that does not attract the carbon nanotubes is present outside of the trenches 502.

In one exemplary embodiment, the substrate 504 includes a layer of a first material 602 and a layer of a second material 604 disposed on the first material 602, wherein the first material 602 has an isoelectric point greater than X and the second material 604 has an isoelectric point less than X, wherein X=7. See, for example, FIG. 6 which provides an enlarged view of one of the trenches 502. Suitable materials 602 having an isoelectric point greater than 7 include, but are not limited to, $HfO_2$, silicon nitride ($Si_3N_4$), zinc oxide (ZnO) and/or aluminum oxide ($Al_2O_3$). Suitable materials 604 having an isoelectric point less than 7 include, but are not limited to, $SiO_2$, tungsten trioxide ($WO_3$), and/or tantalum oxide ($Ta_2O_5$). The trenches 502 are patterned in the layer of the second material 604 such that the first material 602 is exposed at the bottom of the trenches.

Figure 6:
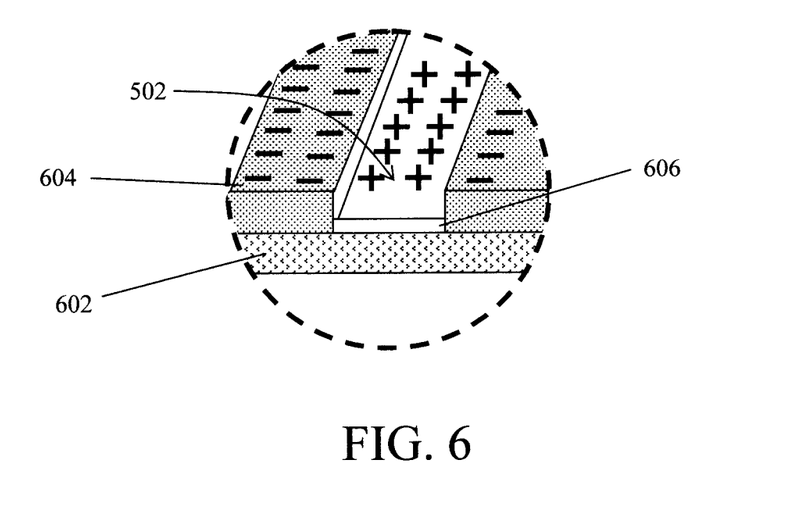
FIG. 6 is a diagram illustrating an enlarged view of one of the trenches according to an embodiment of the present invention.

A layer 606 of a material to which carbon nanotubes selectively bind is then formed on the bottom of the trenches 502 on the exposed material 602. In one exemplary embodiment, the layer 606 is a monolayer of NMPI. Due to its hydroxamic acid end groups (see above), the NMPI will self-assemble on the material having an isoelectric point greater than 7 but not on the material having an isoelectric point less than 7. For instance, $HfO_2$ and $SiO_2$, respectively, were used in the above example. Thus, in that case, the NMPI monolayer will form on the bottom of the trenches 502, which is the only place where the first material 602 is exposed.

NMPI is however not the only option. For instance, according to another exemplary embodiment, the exposed first material 602 within the trenches 502 is coated with a bifunctional acid which contains one acid functional group for binding to the exposed first material 602 and another acid functional group for binding to (functionalized) carbon nanotubes. For instance, the acid functional group for binding to the exposed first material 602 (having an isoelectric point greater than 7) can be hydroxamic acid and/or phosphonic acid. The acid functional group for binding to the carbon nanotubes can be carboxylic acid, phosphoric acid, and/or sulfonic acid when the carbon nanotubes are functionalized with a poly-fluorene polymer. See, for example, U.S. patent application Ser. No. 14/974,562 by Afzali-Ardakani et al., entitled "Bifunctional Acid Monolayers for the Selective Placement of Carbon Nanotubes," the contents of which are incorporated by reference as if fully set forth herein. For instance, suitable poly-fluorene polymers include, but are not limited to, poly[9,9-dioctylfluorenyl-2,7-diyl], poly[9,9-dihexylfluorenyl-2,7-diyl], poly[(9,9-dioctylfluorenyl-2,7-diyl)-co-(1,4-phenylene)], poly[(9,9-dioctylfluorenyl-2,7-diyl)-alt-co-(1,4-benzo-2,1',3-thiadiazole)], and/or poly[(9,9-dioctylfluorenyl-2,7-diyl)-alt-co-(2,2'-bipyridine-5,5'-diyl)]. A solution of the functionalized carbon nanotubes can be created and contacted with the (functionalized) substrate. See below.

In the case of NMPI, there will be a different surface charge within the trenches as compared to the surface of the substrate 504. For instance, as shown in FIG. 6, the surface of the second material 604 (having an isoelectric point less than 7) will have a negative surface charge, while the NMPI monolayer, i.e., layer 606, within the trenches will have a positive surface charge. In that case, functionalizing the carbon nanotubes with a negative surface charge (see below) will direct the carbon nanotubes into the trenches 502 based on their attraction to the NMPI (positive surface charge) and away from the surface of the substrate based on their repulsion from the second material (negative surface charge). The mechanism for the bifunctional acid/polyfluorene polymer-wrapped carbon nanotubes is a little different, but operates on the same general principle of selective attraction of the carbon nanotubes to the trenches 504. In that case however, the bifunctional acid exhibits two groups, one attracting to the exposed first material 602 in the trenches 502 and the other to the poly-fluorene polymer-wrapped carbon nanotubes.

Next, a solution 702 of carbon nanotubes 704 is prepared. See FIG. 7. As provided above, the carbon nanotubes 704 in the solution 702 can include both metallic and semiconducting carbon nanotubes. The particular treatment of the carbon nanotubes 702 depends on the selective placement system being employed. For instance, in the above-described case of NMPI, the carbon nanotubes can be wrapped in a surface-active dispersing agent, such as SDS to create a negative surface charge thereon. This can be done in an aqueous solution. Other suitable carbon nanotube surface treatments selective for NMPI binding include, but are not limited to, polymers having side chains with charged functional groups such as a regioregular polythiophene with charged phosphonate side chains. See, for example, U.S. Patent Application Publication Number 2014/0363643 by Afzali-Ardakani et al., entitled "Surface-Selective Carbon Nanotube Deposition Via Polymer-Mediated Assembly," the contents of which are incorporated by reference as if fully set forth herein. Suitable solvents include, but are not limited to, water, ethanol, isopropanol, and dimethylsulfoxide.

Figure 7:
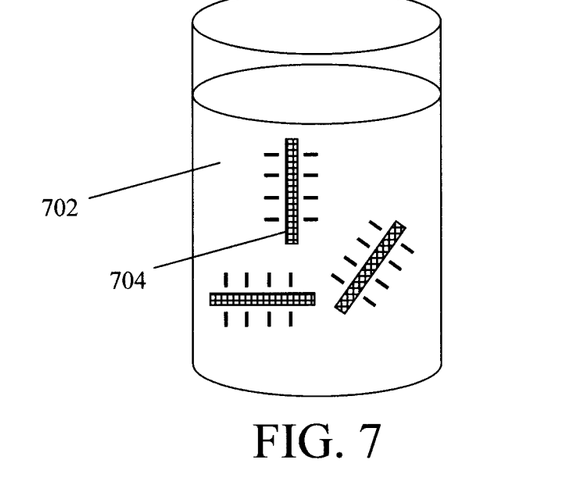
FIG. 7 is a diagram illustrating a solution of carbon nanotubes having been prepared according to an embodiment of the present invention.
Figure 8:
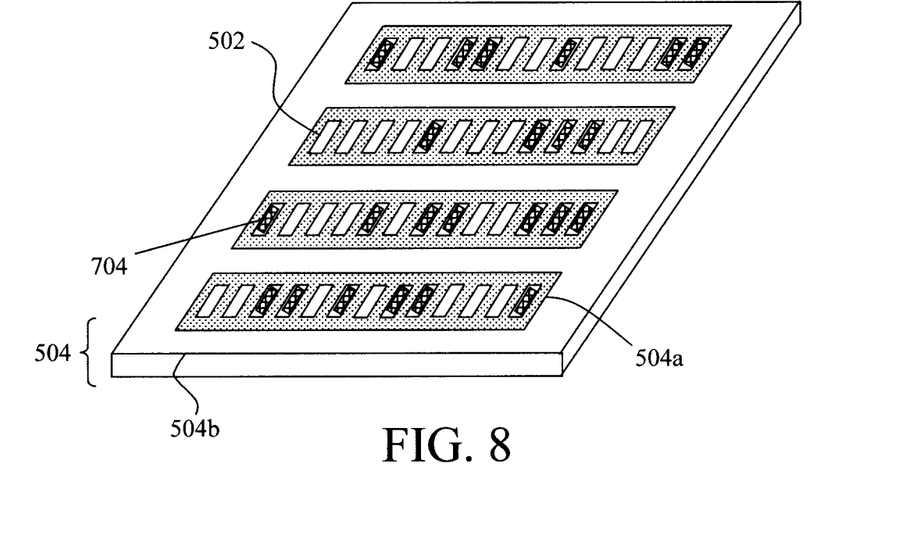
FIG. 8 is a diagram illustrating that, after contacting the solution of carbon nanotubes with the substrate, certain trenches will contain carbon nanotubes, and others will not according to an embodiment of the present invention.

The solution 702 of (functionalized) carbon nanotubes 704 can then be contacted with the substrate 504. For instance, the solution 702 can be poured, spun, or otherwise cast onto the substrate 504. Afterwards, a rinse with extra solvent can be used to remove extra carbon nanotubes (i.e., those carbon nanotubes 704 not present within one of the trenches 504).

Due to the chemical self-assembly process, the (functionalized) carbon nanotubes 704 will be directed towards the trenches 502, and away from the other surfaces of the substrate 504. However, as provided above, the trenches can be configured to have dimensions (e.g., length $T_L$ and/or width $T_w$—see FIG. 5) that will ensure with some probability that a carbon nanotube 704 will or will not fall within each trench 504. For instance, if the trenches 502 are made large enough, a carbon nanotube 704 will likely end up in each trench 502. Conversely, if the trenches 502 are made small enough, then it would be likely that none of the trenches 502 will contain a carbon nanotube 704. For instance, the repulsive forces of a negative surface charge on the carbon nanotubes 704 and on the surface of second material 604 surrounding the trenches 502 will prevent the carbon nanotubes 704 from being drawn into the trenches 502. It is preferable to have something in between these two extremes. Namely, it is desirable to have some probability that a carbon nanotube 704 will or will not enter into each trench 502. Preferably, the probability for a trench 502 to contain or to not contain a carbon nanotube 704 is about equal, i.e., there is a 50% chance that any given trench 502 will or will not contain a carbon nanotube 704. This can be controlled by the trench dimensions. For example, trench-width dependent carbon nanotube placement behavior is explained in U.S. Patent Application Publication Number 2016/0191255 by Haensch et al., entitled "Carbon Nanotube Array for Cryptographic Key Generation and Protection," the contents of which are incorporated by reference as if fully set forth herein.

Figure 5:
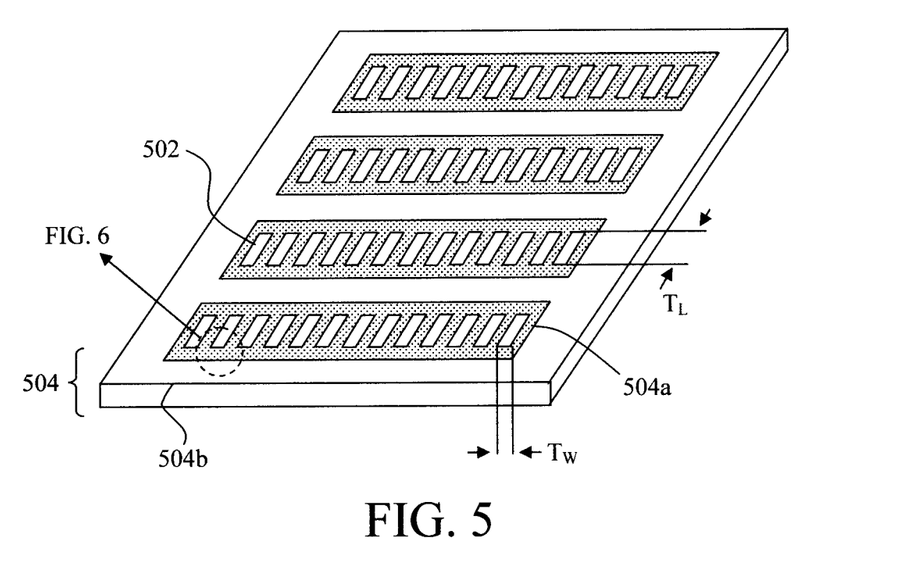
FIG. 5 is a diagram illustrating a plurality of trenches patterned in a substrate according to an embodiment of the present invention.

According to an exemplary embodiment, the trenches 504 are configured to each have the same dimensions (i.e., the same dimensions will be used for each trench in a given array), for example, each trench 504 has a length $T_L$ of from about 500 nanometers (nm) to about 3 micrometers (μm), and ranges therebetween, and a width $T_w$ of from about 20 nm to about 200 nm, and ranges therebetween, which provides about a 50% target placement for carbon nanotubes having a length of from about 300 nm to about 2 μm, and ranges therebetween. This is however merely an example. The appropriate trench dimensions can be determined based on experimentation. For instance, a target placement is first determined. By way of example only, a 50% target placement would mean that about half of the trenches 504 will contain a carbon nanotube and half will not. Next, arrays with trenches of different dimensions are produced—each array having trenches of a certain dimension, and the dimensions of the array having about a 50% placement are selected.

Thus, after contacting the solution 702 of carbon nanotubes 704 with the substrate 504 certain trenches 502 will randomly contain carbon nanotubes 704, and others will not. See FIG. 8. This random placement of carbon nanotubes throughout the array is the unique ID. In order to be able to extract the code information from the array, the carbon nanotubes 704 are next decorated with optically visible nanocrystals. The carbon nanotubes coated with the optically visible nanocrystals are now given reference numeral 704a. See FIG. 9.

Figure 9:
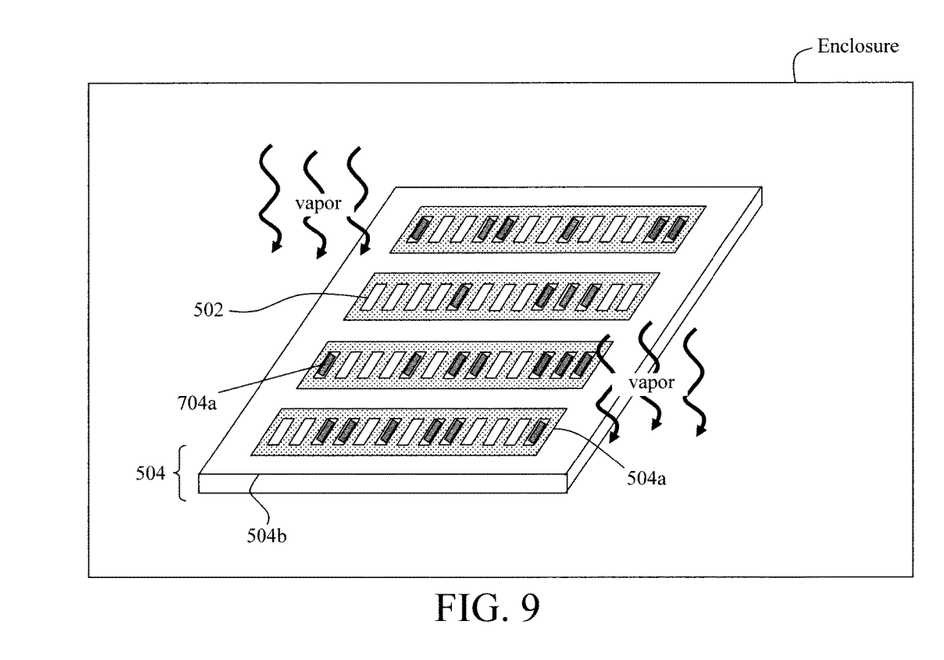
FIG. 9 is a diagram illustrating the carbon nanotubes having been decorated with optically visible nanocrystals according to an embodiment of the present invention.
Figure 10:
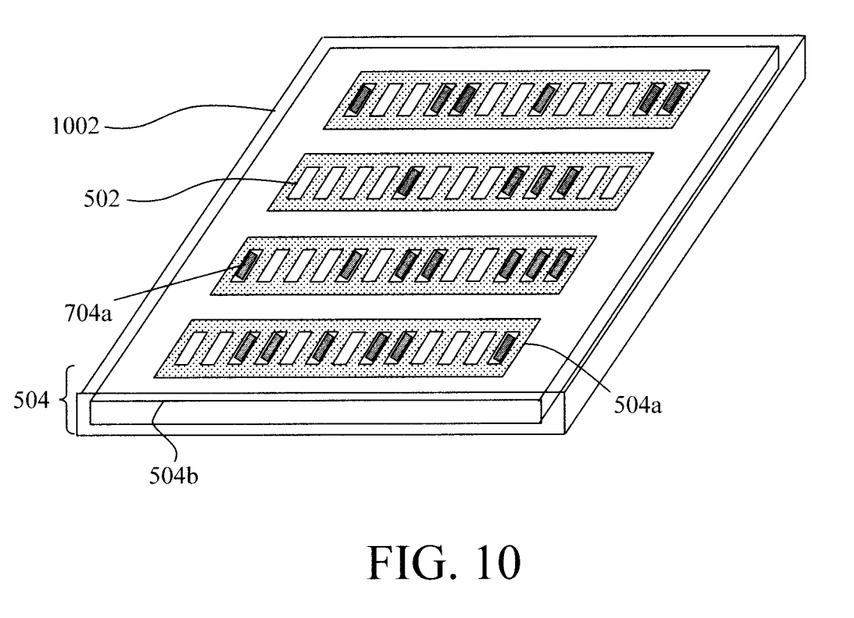
FIG. 10 is a diagram illustrating the array having been covered with a protective coating according to an embodiment of the present invention.

As provided above, suitable optically visible nanocrystals for decorating the carbon nanotubes 704 include, but are not limited to, p-nitrobenzoic acid (p-NBA), halogenated 4-nitrobenzoic acids, 2-fluoro-4-nitrobenozic acid, 3,5-difluoro-4-nitrobenozic acid, 2-iodo-4-nitrobenzoic acid, 2,3,5,6-tetrafluoro-4-nitrobenzoic acid, 3,5-dimethyl-4-nitrobenzoic acid, and/or 3-trifluoromethyl-4-nitrobenzoic acid. Sublimation can be used to coat the carbon nanotubes 704 with these materials. For instance, a source of the nanocrystals such as a powder containing at least one of the above-listed compounds is heated within an enclosure under conditions sufficient to create a vapor, e.g., at a temperature of from about 100° C. to about 200° C., and ranges therebetween, for a duration of from about 10 minutes to about 1 hour, and ranges therebetween. As shown in FIG. 9, the array with randomly placed carbon nanotubes 704 is then placed within the enclosure in contact with the vapor. The vapor will condense as nanocrystals on the surfaces of the carbon nanotubes 704, forming coated carbon nanotubes 704a. The code information about the placement of the carbon nanotubes 704a can now be read from the array optically, e.g., using an optical microscope and digital image processing.

First, however, it may be desirable to cover the decorated carbon nanotube array with a protective coating 1002. See FIG. 10. Namely, the unique ID array may be associated with a retail product (such as on a label) and in that case one would want to prevent the unique ID array from getting disrupted or otherwise damaged in a way that would compromise the code information. The protective coating 1002 should be transparent to enable extracting the code information optically. Suitable protective coatings include, but are not limited to, dielectric materials such as silicon dioxide ($SiO_2$) which, if kept thin (e.g., from about 1 nanometer (nm) to about 5 nm, and ranges therebetween), will be transparent.

Figure 11:
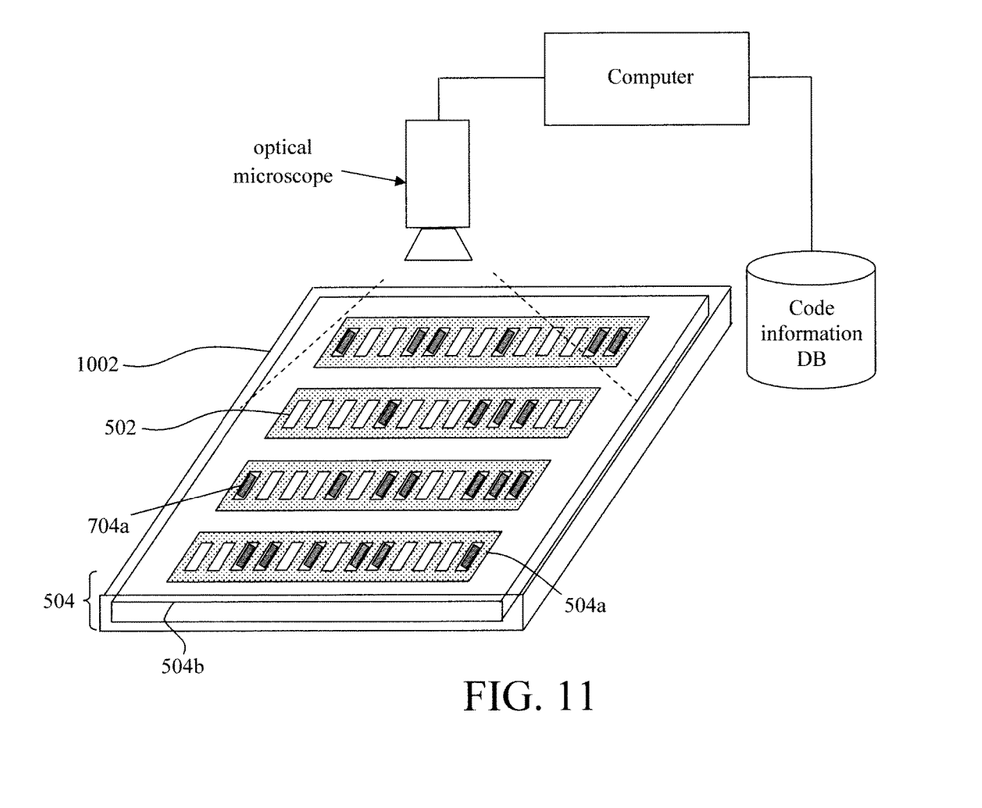
FIG. 11 is a diagram illustrating code information extracted from the array using an optical microscope according to an embodiment of the present invention.
Figure 12:
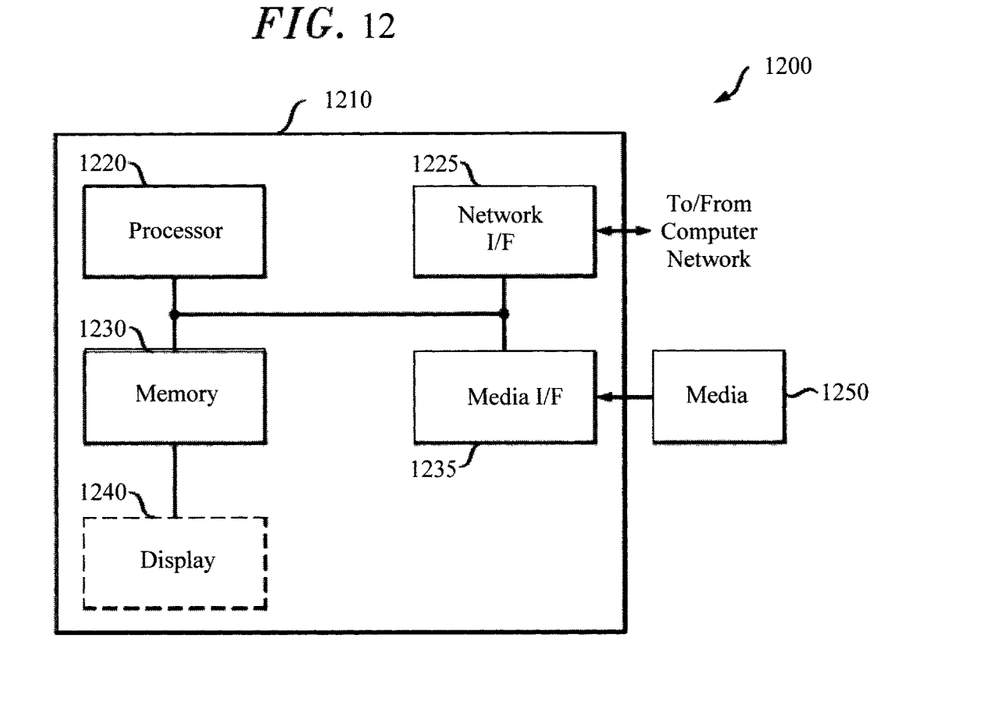
FIG. 12 is a diagram illustrating an exemplary apparatus for performing one or more of the methodologies presented herein according to an embodiment of the present invention.

As shown in FIG. 11, the code information can be read from the array using an optical microscope. As provided above, the optical microscope can capture a digital image of the array including the decorated carbon nanotubes. The digital image can be analyzed by a computer to determine the code information, i.e., the placement of the carbon nanotubes across the array. An exemplary apparatus that can serve as the computer is shown in FIG. 12, described below. The computer can be able to access data in a secured database. See FIG. 11. That data in the database can include code information as well as associated product, time/date/location data, etc. The array can be read in this manner for instance at the point of origin, distribution, etc. of the product and/or upon sale, receipt, etc. See, for example, methodology 300, described above. With the former, the computer can extract the code information from the array and store it in the secure database. In the latter case, the computer can compare the extracted code information with the code information previously stored for the array in the database, i.e., to validate authenticity.

An exemplary apparatus 1200 that may be configured to serve as the computer is shown in FIG. 12. Apparatus 1200 may be used in implementing one or more of the methodologies presented herein.

Apparatus 1200 includes a computer system 1210 and removable media 1250. Computer system 1210 includes a processor device 1220, a network interface 1225, a memory 1230, a media interface 1235 and an optional display 1240. Network interface 1225 allows computer system 1210 to connect to a network, while media interface 1235 allows computer system 1210 to interact with media, such as a hard drive or removable media 1250.

Processor device 1220 can be configured to implement the methods, steps, and functions disclosed herein. The memory 1230 could be distributed or local and the processor device 1220 could be distributed or singular. The memory 1230 could be implemented as an electrical, magnetic or optical memory, or any combination of these or other types of storage devices. Moreover, the term "memory" should be construed broadly enough to encompass any information able to be read from, or written to, an address in the addressable space accessed by processor device 1220. With this definition, information on a network, accessible through network interface 1225, is still within memory 1230 because the processor device 1220 can retrieve the information from the network. It should be noted that each distributed processor that makes up processor device 1220 generally contains its own addressable memory space. It should also be noted that some or all of computer system 1210 can be incorporated into an application-specific or general-use integrated circuit.

Optional display 1240 is any type of display suitable for interacting with a human user of apparatus 1200. Generally, display 1240 is a computer monitor or other similar display.

Although illustrative embodiments of the present invention have been described herein, it is to be understood that the invention is not limited to those precise embodiments, and that various other changes and modifications may be made by one skilled in the art without departing from the scope of the invention.

What is claimed is:

1. A method for creating a unique identification (ID), the method comprising the steps of:
providing a substrate having an array of trenches;
randomly placing carbon nanotubes throughout the array of trenches such that each trench either contains a carbon nanotube or does not, wherein the random placement of the carbon nanotubes throughout the array of trenches comprises code information that forms the unique ID; and
coating the carbon nanotubes with optically visible nanocrystals, wherein the optically visible nanocrystals are selected from the group consisting of: p-nitrobenzoic acid, halogenated 4-nitrobenzoic acids, 2-fluoro-4-nitrobenozic acid, 3,5-difluoro-4-nitrobenozic acid, 2-iodo-4-nitrobenzoic acid, 2,3,5,6-tetrafluoro-4-nitrobenzoic acid, 3,5-dimethyl-4-nitrobenzoic acid, 3-trifluoromethyl-4-nitrobenzoic acid, and combinations thereof.

2. The method of claim 1, wherein the carbon nanotubes comprise both semiconducting and metallic carbon nanotubes.

3. The method of claim 1, wherein the carbon nanotubes are randomly placed throughout the array of trenches using a chemical self-assembly process.

4. The method of claim 3, wherein the substrate comprises a material exposed at a bottom of the trenches having an isoelectric point greater than 7.

5. The method of claim 4, further comprising the steps of:
forming a monolayer of 4-(N-hydroxycarboxamido)-1-methylpyridinium iodide on the material at the bottom of the trenches;
creating a solution of the carbon nanotubes wrapped in sodium dodecylsulfate; and
contacting the solution with the substrate.

6. The method of claim 4, further comprising the steps of:
forming a monolayer of 4-(N-hydroxycarboxamido)-1-methylpyridinium iodide on the material at the bottom of the trenches;
creating a solution of the carbon nanotubes functionalized with a regioregular polythiophene with charged phosphonate side chains; and
contacting the solution with the substrate.

7. The method of claim 4, further comprising the steps of:
coating the material at the bottom of the trenches with a bifunctional acid comprising i) a first acid functional group selected from the group consisting of: hydroxamic acid, phosphonic acid, and combinations thereof, and ii) a second acid functional group selected from the group consisting of: carboxylic acid, phosphoric acid, sulfonic acid, and combinations thereof;
creating a solution of the carbon nanotubes functionalized with a poly-fluorene polymer selected from the group consisting of: poly[9,9-dioctylfluorenyl-2,7-diyl], poly[9,9-dihexylfluorenyl-2,7-diyl], poly[(9,9-dioctylfluorenyl-2,7-diyl)-co-(1,4-phenylene)], poly[(9,9-dioctylfluorenyl-2,7-diyl)-alt-co-(1,4-benzo-2,1',3-thiadiazole)], poly[(9,9-dioctylfluorenyl-2,7-diyl)-alt-co-(2,2'-bipyridine-5,5'-diyl)], and combinations thereof; and
contacting the solution with the substrate.

8. The method of claim 1, further comprising the step of:
controlling dimensions of the trenches to control a probability that at least one of the carbon nanotubes will enter into the trenches.

9. The method of claim 8, wherein the probability that at least one of the carbon nanotubes will enter into the trenches is about 50%.

10. The method of claim 1, wherein the carbon nanotubes are coated with the optically visible nanocrystals using sublimation.

11. The method of claim 10, further comprising the steps of:
heating a source of the optically visible nanocrystals under conditions sufficient to create a vapor; and
contacting the carbon nanotubes with the vapor.

12. The method of claim 11, wherein the conditions comprise a temperature of from about 100° C. to about 200° C. and ranges therebetween, and a duration of from about 10 minutes to about 1 hour and ranges therebetween.

13. The method of claim 1, further comprising the step of:
covering the unique ID with a thin protective coating, wherein the thin protective coating comprises a transparent dielectric material having a thickness of from about 1 nanometer to about 5 nanometers and ranges therebetween.

14. A unique ID, comprising:
a substrate having an array of trenches;
carbon nanotubes randomly placed throughout the array of trenches such that each trench either contains a carbon nanotube or does not, wherein the random placement of the carbon nanotubes throughout the array of trenches comprises code information that forms the unique ID; and
optically visible nanocrystals coating the carbon nanotubes, wherein the optically visible nanocrystals are selected from the group consisting of: p-nitrobenzoic acid, halogenated 4-nitrobenzoic acids, 2-fluoro-4-nitrobenozic acid, 3,5-difluoro-4-nitrobenozic acid, 2-iodo-4-nitrobenzoic acid, 2,3,5,6-tetrafluoro-4-nitrobenzoic acid, 3,5-dimethyl-4-nitrobenzoic acid, 3-trifluoromethyl-4-nitrobenzoic acid, and combinations thereof.

15. The unique ID of claim 14, further comprising:
a thin protective coating covering the unique ID with, wherein the thin protective coating comprises a transparent dielectric material having a thickness of from about 1 nanometer to about 5 nanometers and ranges therebetween.

16. An authentication method, comprising the steps of:
providing a unique ID comprising: a substrate having an array of trenches, carbon nanotubes randomly placed throughout the array of trenches such that each trench either contains a carbon nanotube or does not, and optically visible nanocrystals coating the carbon nanotubes, wherein the random placement of the carbon nanotubes throughout the array of trenches comprises code information that forms the unique ID, and wherein the optically visible nanocrystals are selected from the group consisting of: p-nitrobenzoic acid, halogenated 4-nitrobenzoic acids, 2-fluoro-4-nitrobenozic acid, 3,5-difluoro-4-nitrobenozic acid, 2-iodo-4-nitrobenzoic acid, 2,3,5,6-tetrafluoro-4-nitrobenzoic acid, 3,5-dimethyl-4-nitrobenzoic acid, 3-trifluoromethyl-4-nitrobenzoic acid, and combinations thereof;
capturing an image of the unique ID;
analyzing the image to extract the code information from the unique ID; and using the code information extracted from the unique ID for authentication.

17. The authentication method of claim 16, further comprising the steps of:
   extracting the code information from the unique ID at a time T1;
   storing the code information extracted from the unique ID at the time T1;
   extracting the code information from the unique ID at a time T2; and
   comparing the code information extracted from the unique ID at the time T1 with the code information extracted from the unique ID at the time T2.

18. The authentication method of claim 17, further comprising the step of:
   determining whether the code information extracted from the unique ID at the time T1 matches the code information extracted from the unique ID at the time T2.

19. The authentication method of claim 16, further comprising the step of:
   associating the unique ID with a product.

\* \* \* \* \*